(12) United States Patent
Llorente Hompanera

(10) Patent No.: US 6,197,359 B1
(45) Date of Patent: *Mar. 6, 2001

(54) USE OF SILICONE FOR MANUFACTURING CONFECTIONERY MOULDS AND BAKING RECEPTACLES IN GENERAL

(75) Inventor: Jose' Maria Llorente Hompanera, La Llagosta (ES)

(73) Assignee: Lekue, S.L. (ES)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,133

(22) Filed: Apr. 23, 1999

(51) Int. Cl.$^7$ ...................................................... A47J 37/01
(52) U.S. Cl. .............................. 426/523; 99/324; 99/426; 220/573.1; 220/573.2; 426/520
(58) Field of Search .............................. 264/219, 331.11; 249/134, DIG. 1; 425/DIG. 44; 99/426, 324; 220/573.1, 573.2, 912, DIG. 12; 426/520, 523

(56) References Cited

U.S. PATENT DOCUMENTS

| | | | |
|---|---|---|---|
| 4,040,539 | * | 8/1977 | Patterson ................................. 220/22 |
| 4,068,993 | * | 1/1978 | Dacey et al. ......................... 425/104 |
| 4,076,207 | * | 2/1978 | Austin ................................. 249/66 R |
| 4,200,658 | * | 4/1980 | Katzman et al. ..................... 426/512 |
| 4,812,115 | * | 3/1989 | Kemp ................................. 425/405.2 |
| 5,232,609 | * | 8/1993 | Prevost et al. ....................... 249/102 |

FOREIGN PATENT DOCUMENTS 2747886    10/1997   (FR) .

* cited by examiner

*Primary Examiner*—Jan H. Silbaugh
*Assistant Examiner*—Suzanne E McDowell
(74) *Attorney, Agent, or Firm*—Steinberg & Raskin, P.C.

(57) ABSTRACT

Use of silicone for the manufacturing of confectionery molds and baking receptacles in general. The silicone may be a heat-curable elastomer of the type intended for applications in contact with foodstuffs, advantageously methyl-vinyl-polysiloxane, and it may be obtained by a process of cross-linking with platinum. The operation of removal of the baked product from the mold is simplified; further, the molds can be easily made in any desired shapes and handling of the molds is improved.

3 Claims, No Drawings

USE OF SILICONE FOR MANUFACTURING CONFECTIONERY MOULDS AND BAKING RECEPTACLES IN GENERAL

The present invention relates to the use of silicone for the manufacturing of confectionery moulds and baking receptacles in general.

BACKGROUND OF THE INVENTION

Silicone is a material of polymeric nature whose chains are made up of alternating oxygen and silicon atoms. Silicones are normally prepared by hydrolysis and subsequent polymerisation of alkylhalogensilanes (both acid- and base-catalysed). The alkylhalogensilanes are in practice made by a direct process, Cu-catalysed, in which the Si reacts with the corresponding alkyl halide. This process provides mixtures of products, whose composition can be modified by a process of redistribution to yield the desired monomer.

Known in the art are silicone elastomers, which are made up of linear polymers. A cross-linking phase is required in order to provide the elastic properties. The most common elastomers are those deriving from dichloromethylsilane, with molecular weights ranging between 300,000 and 700,000. They are made by a prepolymerisation that provides octamethylcyclotetrasiloxane, purification thereof and subsequent polymerisation in the presence of a small quantity of monofunctional material in order to control the molecular weight, followed by a cross-linking similar to curing, in the presence of peroxides, which lends the material its elastic properties. Other important elastomers are those that contain a small proportion (0.1% molar) of vinyl groups linked to silicon, which undergo much more effective curing, and those that contain between 10 and 15% molar of phenyl groups, and good elastic properties at low temperatures. Elastomers of a much lower molecular weight (10,000 to 100,000) can be obtained by using linear polymer chains ending in silanol groups, which can be cured at room temperature by reaction with an alkoxylane.

In general, the most important characteristic of the silicone elastomers is the fact that they present a very broad thermal spectrum of use (from −50° C. to 200° C.) without a significant alteration of their properties. They have good electrical insulation properties, do not self-oxidise or undergo attack by chemical agents in aqueous medium and swell in the presence of non-polar organic solvents, although some special types that contain fluoro- or cyano- groups offer greater resistance to this process.

Silicone elastomers find their widest industrial application as electrical insulators, fluid-repellents and oxidation protectors, and in the manufacturing of hermetic gaskets. The silicones are highly inert materials, and they repel water. Silicone is inert to chemical agents, with the exception of strong bases and acids, and its toxicity is generally low. The origin of these properties lies essentially in the high stability of the Si—O bond (106 Kcal/mol), and in its strong partial ionic character.

Other known uses of silicones are in the manufacturing of containers for liquids (such as wineskins) and tubes for transporting substances (such as the tubes used for blood transfusions).

DESCRIPTION OF THE INVENTION

The present invention is aimed at the use of silicone for the manufacturing of confectionery moulds and the manufacturing of baking receptacles in general.

The use of silicone for manufacturing confectionery moulds presents many advantages over use of the conventional materials applied in the known confectionery moulds.

The known moulds are generally manufactured in aluminium, clay or fibreglass. Use of such materials has the disadvantage that, because they are rigid moulds, the mould-removal operation is difficult. Certain types of moulds manufactured in aluminium have had to have their structural complexity increased in order to incorporate a mould-removal system that comprises means of opening of the side wall of the mould in order to take the food out once cooked. Aluminium moulds are thus known whose side wall is articulated so that it can be opened suitably in order to remove the food once cooked. Said moulds have means for locking the side wall in order to keep the side wall closed so that the food retains its shape during cooking.

The use of silicone to manufacture the confectionery moulds and baking receptacles in general of the invention solves the disadvantages of the confectionery moulds and baking receptacles in the prior art. As will become clear below, the use object of the present invention offers many other advantages which will be set out below.

The present invention is based on use of a heat-curable elastomer for the manufacturing of confectionery moulds and baking receptacles in general. This heat-curable elastomer is of the type intended for applications involving contact with food.

The use of silicone has interesting features that afford many advantages, which are set out below.

Firstly, thanks to the characteristic properties of silicone, the operation of removing a product from the mould is very simple owing to the elasticity that the silicone confers upon the mould or baking receptacle. Users can thus effectively handle said mould or baking receptacle in order to remove the food product from the mould, in the secure knowledge that the mould will recover its initial shape. The characteristics of the silicone provide considerable flexibility of shapes from a constructive viewpoint, so that the moulds and receptacles can be made in any shape and size to suit user requirements.

Secondly, the heat resistance of the silicone used in the present invention provides highly versatile moulds and baking receptacles, since they can be used in conventional ovens, microwave ovens, and even in freezers. The good physical and chemical stability of the silicone used provides a wide thermal spectrum of use (−40°C. to 200° C.) and very good resistance to thermal ageing and to oxidating agents (oxygen, ozone, UV).

Thirdly, the low adherence offered by the silicone surfaces makes moulds and baking receptacles manufactured with the silicone of the invention highly suited to the purposes described.

Fourthly, the above-mentioned flexibility of the heat-curable elastomer of the type destined for applications in contact with foods of the present invention provides moulds and baking receptacles that can be stored taking up a minimum space. It should be noted that the flexibility of the silicone used is mainly due to the wide angle of the Si—O—Si bond and to the large distance between the Si and O atoms, together with the absence of substituents on the O atom.

Fifthly, special emphasis should also be placed on the fact that the elastomer in question does not retain much heat. This is important in practice, since it prevents users from burning their hands when handling the mould or receptacle in question.

In accordance with a first aspect of the invention, the silicone used is of the methyl-vinyl-polysiloxane (VMQ) type The inorganic character of the Si—O—Si chain of the methyl-vinyl-polysiloxane provides an innocuous product and, therefore, one suitable for use with food. It should also be borne in mind that methyl-vinyl-polysiloxane (VMQ) does not alter the taste of foods, while it further has a low concentration of volatile substances, which has a positive influence on the post-curing process of the silicone mould, as will be described below.

The nature of the polymer provides exceptional mechanical characteristics, as shown in the table below.

| Property | Value |
|---|---|
| Hardness | 55 Sh A |
| Breaking strength | 9 Mpa |
| Elongation | 450% |
| Tear resistance | 30 N/mm |

Silicone of the methyl-vinyl-polysiloxane type is fully biocompatible, since it shows no bacterial adhesion due to its capacity for constructing non-polar surfaces which develop minimum interaction with biological systems.

A mould and/or baking receptacle is thus provided that can be washed easily. In this respect, it should be noted that said mould or receptacle can be washed in a dishwasher.

All the advantages mentioned above lead to the conclusion that this is a highly advantageous material for use in contact with foodstuffs. For that purpose, and owing to the low concentration of volatile substances, as mentioned above, a short post-curing process is sufficient in order to comply with current legislation on products in contact with foodstuffs.

In accordance with a second aspect of the present invention, the silicone is obtained by a cross-linking process with platinum, as illustrated below.

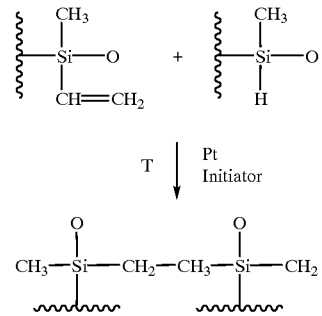

The foregoing formulation illustrates the general schema of a cross-linking reaction by Pt. Thanks to said process the polyaddition reaction takes place much more quickly than reactions initiated by organic peroxides. On the other hand, the use of platinum as a catalyst of the polymerisation process does not generate decomposition by-products. As a consequence, it can be stated that this process does not produce toxic peroxide residues or odours in the cross-linked products. Advantageously, neither are any compounds produced that could alter the taste of foods. For this reason, the type of silicone chosen is totally compatible with the use described in this specification.

A mould or baking receptacle manufactured in accordance with the present invention is preferably manufactured by moulding the pieces in chromium-plated moulds at a temperature of 190 to 200° C. for 3 minutes. Once the piece has been moulded, the post-curing operation is carried out in order to sterilise the piece. Said post-curing operation consists in placing the piece in a hot-air oven or forced-circulation oven at a maximum temperature of about 200° C. for 5 hours. Once post-cured, the mould is placed for half an hour in an industrial washer and dryer in order to purify the piece.

The invention relates to the use of silicone for confectionery moulds and other baking receptacles in general, independently of the shape and dimensions thereof or the accessory details that might arise. It will thus be obvious to an expert in the subject that silicones with organic colorants (suitable for contact with foodstuffs) can be used. As a result, said shapes, dimensions and accessory details may be suitably replaced by others that are technically equivalent, as long as they do not depart from the essential nature of the object of the present invention or from the scope of protection defined by the appended claims.

What is claimed is:

1. A method for baking a food product comprising the steps of:

providing a flexible and foldable mold formed substantially in its entirety of a silicone elastomer material obtained by cross-linking with platinum;

depositing a food product to be baked into the mold;

placing the mold containing the food product to be baked in an oven at a baking temperature for a predetermined time until the food product is baked;

removing the mold containing the baked food product from the oven; and removing the baked food product from the mold.

2. The method of claim 1, where said silicone elastomer comprises a food grade, heat-curable silicone elastomer.

3. The method of claim 1, wherein said silcone elastomer comprises methyl-vinyl-polysiloxane.

* * * * *

US006197359C1

(12) EX PARTE REEXAMINATION CERTIFICATE (5837th)
United States Patent
Hompanera

(10) Number: US 6,197,359 C1
(45) Certificate Issued: *Jul. 31, 2007

(54) USE OF SILICONE FOR MANUFACTURING CONFECTIONERY MOULDS AND BAKING RECEPTACLES IN GENERAL

(75) Inventor: Jose' Maria Llorente Hompanera, La Llagosta (ES)

(73) Assignee: Lekue S.L., La Llagosta (ES)

(*) Notice: This patent issued on a continued prosecution application filed under 37 CFR 1.53(d), and is subject to the twenty year patent term provisions of 35 U.S.C. 154(a)(2).

Reexamination Request:
No. 90/007,036, May 10, 2004

Reexamination Certificate for:
Patent No.: 6,197,359
Issued: Mar. 6, 2001
Appl. No.: 09/298,133
Filed: Apr. 23, 1999

(51) Int. Cl.
  *A23G 3/02* (2006.01)
  *A23G 1/04* (2006.01)
  *A23G 1/22* (2006.01)
  *B29C 45/00* (2006.01)

(52) U.S. Cl. .................. 426/523; 426/520; 220/573.1; 220/573.2; 99/324; 99/426

(58) Field of Classification Search ............... 426/520, 426/523; 99/324, 426; 220/573.1, 573.2
See application file for complete search history.

(56) References Cited

U.S. PATENT DOCUMENTS

| | | | |
|---|---|---|---|
| 2,823,218 A | 2/1958 | Speier | |
| 3,844,992 A | 10/1974 | Antonen | 260/18 |
| 3,957,713 A | 5/1976 | Jeram | 260/32.8 |
| 4,072,635 A | 2/1978 | Jeram | 260/2.5 |
| 4,108,833 A | 8/1978 | Hatanaka | 528/31 |
| 4,427,801 A | 1/1984 | Sweet | 523/212 |
| 4,581,391 A | 4/1986 | Baldwin et al. | 523/179 |
| 4,741,965 A | 5/1988 | Zerfass et al. | 428/447 |
| 4,755,554 A | 7/1988 | Itoh et al. | 524/588 |
| 4,929,460 A * | 5/1990 | Lagarde et al. | 426/420 |
| 4,978,696 A | 12/1990 | Clark et al. | 523/212 |
| 5,000,029 A | 3/1991 | Laurent et al. | 72/465 |
| 5,088,179 A | 2/1992 | Gibbon | |
| 5,203,491 A | 4/1993 | Marx et al. | 229/2.5 |
| 5,543,450 A | 8/1996 | Takita et al. | 524/190 |
| 5,548,006 A | 8/1996 | Hirabayashi et al. | 524/82 |
| 6,080,829 A | 6/2000 | Tapsak et al. | 528/35 |
| 6,200,620 B1 * | 3/2001 | Brinker | 426/389 |

FOREIGN PATENT DOCUMENTS

| | | |
|---|---|---|
| AT | E46125 | 4/1990 |
| DE | 3312755 | 4/1983 |
| EP | 0091737 | 3/1983 |
| EP | 0220898 | 10/1986 |
| EP | 0234168 | 11/1986 |
| EP | 0519372 | 12/1992 |
| EP | 0601906 | 11/1993 |
| EP | 0637421 | 2/1995 |
| FR | 1360908 | 5/1963 |
| FR | 2658034 | 2/1990 |
| FR | 2545415 | 5/1993 |
| FR | 2747885 | 10/1997 |
| FR | 2747886 | 10/1997 |
| GB | 1041082 | 6/1963 |
| GB | 2254036 | 9/1992 |
| JP | 63125541 | 5/1988 |
| JP | 02009344 | 6/1988 |
| JP | 03250038 | 2/1990 |
| JP | 07291820 | 4/1994 |
| JP | 11106659 | 4/1999 |
| WO | WO92/21243 | 5/1992 |

OTHER PUBLICATIONS

Rubber Technology, "Silicone Rubber", Third Edition, 1987 by Van Nostrand Reinhold, pp. 406–409.*
"Indirect food additives: Adhesives and components of coatings." Food and Drug Administration, USA Federal Register, Dec. 23, 1998, 63(246) pp. 71016–71018.
"High–temperature properties of elastomer vulcanizates." E.W. Bergstrom US Dept. Of Commerce, Office Tech. Serv., PB & Rept. 161689, 47, (1960).
"Polymer Technology Dictionary" T. Wheelan; Chapman and Hall, 1994, pp. 396–397.
"How it all began" and "Food Manufacturing" in Silicones at Work; Department of Scientific and Industrial Research (UK), Information division (1961).
"Silicon–containing polymers—silicones" in Heat–resistant polymers; technology useful materials. Critchley, Knight and Wright (Eds); Plenum Press, New York, 1983, pp. 328–341.
"Silicones—chemistry and technology" Symposium held Apr. 18, 1989 by: Bayer AG, Th. Goldschmidt AG, Wacker–Chemie GmbH, Haus der Technik, eV; Vulcan–Verlag Essen, 1991, pp. 21–33 and 61–73.
ELASTOSIL M—The Flexible Mould–Making Material for Perfect Copes—A Mould Maker's Guide, Wacker–Chemie–GmbH ("Wacker"), Published in 1992, republished in 1994.
Extracts from "Festive Baking in Austria, Germany and Switzerland" by Sarah Kelly (1$^{st}$ published in 1985).
Rhone Poulenc Technical Leaflet dated Sep. 1994 (M8) for Silibione RTV 71557 A&B (PEX) Material.
Dow Corning Technical Leaflet dated Oct. 6, 1998 (M8) for SILASTIC® 9280–70.
Federal Register, vol. 63, No. 246 dated Dec. 23, 1998, pp. 71016–71018 (M11).

(Continued)

*Primary Examiner*—Stephen Stein

(57) ABSTRACT

Use of silicone for the manufacturing of confectionery molds and baking receptacles in general. The silicone may be a heat-curable elastomer of the type intended for applications in contact with foodstuffs, advantageously methyl-vinyl-polysiloxane, and it may be obtained by a process of cross-linking with platinum. The operation of removal of the baked product from the mold is simplified; further, the molds can be easily made in any desired shapes and handling of the molds is improved.

OTHER PUBLICATIONS

Principles of Polymerization, $3^{rd}$ Ed., George Odian, John Wiley & Sons, Inc., 1991, pp. 140 & 705–707.
Catalogue by LEKEUE dated 1998 (M14).
Catalogue Cardin Deco Relief 1996.
Anlage 1—Wacker RTV–2 Siliconkautschuk—Verarbeitung; S.2 letzter Abs., S.3 letzter.
Anlage 2—Prospekblatt Martens; S.1 zweites Bild, S.2 "Funktion".
Anlage 6—Datenblatt Bowing; S.1 erste Zeile, erster Abs.
Anlage 8—ChipScaleReview; S.6 funfter Absatz.
Firemenprospekt zu ®SILIBIONE RTV 71557 A und B der firma Rhodia, Veroffentlicht: Feb. 1999.
Sicherheitshatenblatt zu SILIBIONE RTV 71557 B; Veroffentlicht: Jun. 6, 1997.
63 FR 71016, Federal Register, vol. 63, Nr. 246 Rules and Regulations, Department of Health and Human Services (HHS) vom Dec. 23, 1998.
(D5): Gastrofelex la Patisserie facile par Bourgeant, Lyon Eurepo Jan. 23–27, 1999.
(D6): BOURGEAT, Catalogue Tarif 99, Jan. 1999.
Collier's Encyclopedia, P.F. Collier & Son, Ltd. Canada, vol. 21, 1970, pp. 27–29.
Bundesgesundheitsblatt Nr. 1 vom Jan. 11, 1974, S. 13 bis 16.
Ulmann's Encyclopedia of Industrial Chemistry, Aug. 5, 1993 S. 57 bis 93.
ENCLOSURE—6: Romp, "Kompaktbasislexikon der Chemie", p. 1955–1959.
ENCLOSURE—7: "Processing Elastosil® LR Liquid Silicone Rubber", Wacker Silicones.
ENCLOSURE—8: "Silicones & Industrie. Guide Practique". Edited by Wacker–Chemie GmbH, Munich, 1995.
ENCLOSURE—9: "Elastosil® M Mold–making compounds for maximum precision".
ENCLOSURE—10: Quilon Chrome Complexes. For release and Surface Treatment. Properties, Uses, Storage and Handling. Du Pont.
Article "Les elastomeres silicones: mise en oeuvre, proprietes et applications . . . " publie dans la revue periodique "Plastiques modernes et elastomeres" en Sep. 1996.
Description of platinum– and peroxide–catalysed HTV silicones—Kirk–Othmer, Encyclopedia of Chemical Technology, $3^{rd}$ Ed., vol. 20, p. 948, lines 8–11; p. 950, lines 4–11 (doc. M4).
Dow Corning 1009 Bakery Release Coating.
ENCLOSURE—11: Technical Data Sheet of Neccoplex.
Arrete interministeriel du Nov. 25, 1992 (JO du Dec. 17, 1992) relatif aux materiaux et objets en elastomeres de silicone mis ou des denrees, produits et boissons afimentaires; et.
Walter Noll, Chemistry and Technology, 1968, 395–399, Academic Press, Inc., USA.
Safety Data Sheet, Silbione RTV71557 A Pex, Nov. 27, 1996.
Safety Data Sheet, Silbione RTV 71557 B Pex, Jun. 6, 1997.
Technical Brochure, Silbione, Food Contact Substance, Silbione RTV 71557 A&B (Pex), Sep. 1994.
Ullmann's Encyclopedia of Industrial Chemistry, vol. A24, 5th Edition, pp. 58–92, 1993.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–3 are cancelled.

* * * * *